(12) United States Patent
Jia et al.

(10) Patent No.: US 12,199,796 B2
(45) Date of Patent: Jan. 14, 2025

(54) CHANNEL MEASUREMENT METHOD AND APPARATUS, ELECTRONIC DEVICE AND COMPUTER-READABLE STORAGE MEDIUM

(71) Applicant: ZTE CORPORATION, Guangdong (CN)

(72) Inventors: Qichen Jia, Guangdong (CN); Ning Wei, Guangdong (CN); Nan Li, Guangdong (CN); Zhiqiang Han, Guangdong (CN); Bo Sun, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 157 days.

(21) Appl. No.: 17/770,340

(22) PCT Filed: Aug. 6, 2020

(86) PCT No.: PCT/CN2020/107399
§ 371 (c)(1),
(2) Date: Apr. 20, 2022

(87) PCT Pub. No.: WO2021/077852
PCT Pub. Date: Apr. 29, 2021

(65) Prior Publication Data
US 2022/0393912 A1    Dec. 8, 2022

(30) Foreign Application Priority Data
Oct. 23, 2019    (CN) .......................... 201911011781.3

(51) Int. Cl.
*H04L 25/02*    (2006.01)
*H04B 17/309*    (2015.01)

(52) U.S. Cl.
CPC ....... *H04L 25/0242* (2013.01); *H04B 17/309* (2015.01); *H04L 25/0204* (2013.01); *H04L 25/0228* (2013.01)

(58) Field of Classification Search
CPC ........................... H04L 5/0048; H04B 7/0452
See application file for complete search history.

(56) References Cited

U.S. PATENT DOCUMENTS 8,982,686 B2    3/2015    Van Nee et al.
10,439,780 B2   10/2019   Park et al.
(Continued)

FOREIGN PATENT DOCUMENTS

CN    102934405 A    2/2013
CN    104253673 A    12/2014
(Continued)

OTHER PUBLICATIONS

WIPO, International Search Report issued on Sep. 30, 2020.
(Continued)

*Primary Examiner* — Zhiren Qin
(74) *Attorney, Agent, or Firm* — Li & Cai Intellectual Property (USA) Office (57) ABSTRACT

The present disclosure provides a channel measurement method and apparatus, an electronic device and a computer-readable storage medium. The method includes: separately determining, by each first device, a first mask sequence, and transforming the first mask sequence to obtain a second mask sequence, and processing a first measurement sequence with the second mask sequence to obtain a second measurement sequence, where the first mask sequence corresponds to the first device; and carrying, by the first device, (Continued)

the second measurement sequence in a channel measurement frame, and sending the channel measurement frame to at least one second device for channel measurement.

7 Claims, 6 Drawing Sheets

(56) References Cited

U.S. PATENT DOCUMENTS

| | | | |
|---|---|---|---|
| 10,756,865 | B2 | 8/2020 | Xue et al. |
| 2012/0026928 | A1* | 2/2012 | Gong ............... H04W 72/30 |
| | | | 370/312 |
| 2015/0156038 | A1 | 6/2015 | Van Nee |
| 2016/0156497 | A1 | 6/2016 | Yang et al. |
| 2017/0141888 | A1* | 5/2017 | Liu .................. H04W 84/12 |
| 2018/0270086 | A1* | 9/2018 | Lin .................. H04W 72/23 |
| 2018/0309552 | A1* | 10/2018 | Akkarakaran ...... H04L 27/2613 |
| 2018/0367276 | A1* | 12/2018 | Xue .................. H04L 25/03866 |
| 2019/0043388 | A1* | 2/2019 | Li .................... H04L 9/0618 |
| 2019/0045361 | A1 | 2/2019 | Gurevitz |
| 2021/0036796 | A1* | 2/2021 | Yuan ................. H04J 13/0048 |
| 2022/0311562 | A1 | 9/2022 | Park |
| 2023/0108897 | A1 | 4/2023 | Yang |

FOREIGN PATENT DOCUMENTS

| | | |
|---|---|---|
| CN | 107135178 A | 9/2017 |
| CN | 107210987 A | 9/2017 |
| IN | 107135178 A | 9/2017 |
| WO | WO2015130618 A2 | 9/2015 |
| WO | WO2018081095 A1 | 5/2018 |
| WO | WO2019047060 A1 | 3/2019 |

OTHER PUBLICATIONS

Korean Patent Office, First office action dated Oct. 19, 2023, for corresponding KR application No. 10-2022-7012565.
European Patent Offfice, extended European Search Report dated Oct. 9, 2023, for corresponding EP application No. 20879888.4.
Singapore Patent Office, the first Office action of the SG application issued Sep. 26, 2024 for application No. SG11202204177Y.

* cited by examiner

FIG. 1

$$P = \begin{bmatrix} 1 & -1 & 1 & 1 \\ 1 & 1 & -1 & 1 \\ 1 & 1 & 1 & -1 \\ -1 & 1 & 1 & 1 \end{bmatrix}$$

Per LTF group

| | | | |
|---|---|---|---|
| Antenna 1: | LTF | -LTF | LTF | LTF |
| Antenna 2: | LTF | LTF | -LTF | LTF |
| Antenna 3: | LTF | LTF | LTF | -LTF |
| Antenna 4: | -LTF | LTF | LTF | LTF |

$$AP_1 : CB_1 = \begin{bmatrix} 1 & -1 & \cdots & 1 & 1 \end{bmatrix}$$
$$AP_2 : CB_2 = \begin{bmatrix} 1 & 1 & \cdots & -1 & 1 \end{bmatrix}$$
$$\vdots$$
$$AP_i : CB_i = \begin{bmatrix} 1 & 1 & \cdots & 1 & -1 \end{bmatrix}$$

$$AP_1 : CB_1 = \begin{bmatrix} \underbrace{1 \quad -1 \quad 1 \quad 1}_{C_{b1}^1} \end{bmatrix}$$

$$AP_2 : CB_2 = \begin{bmatrix} \underbrace{1 \quad 1 \quad -1 \quad 1}_{C_{b2}^1} \end{bmatrix}$$

$$AP_1 : CB_1 = \begin{bmatrix} \underbrace{1 \quad -1}_{C_{b1}^1} & \underbrace{1 \quad 1}_{C_{b1}^2} \end{bmatrix}$$

$$AP_2 : CB_2 = \begin{bmatrix} \underbrace{1 \quad 1}_{C_{b2}^1} & \underbrace{-1 \quad 1}_{C_{b2}^2} \end{bmatrix}$$

A receiving device performs inner product on a third measurement sequence with a first mask sequence, and expands a value of the inner product to obtain a channel measurement result between the receiving device and a corresponding transmitting device, and generates a feedback frame that is sent to the transmitting device — S20

CHANNEL MEASUREMENT METHOD AND APPARATUS, ELECTRONIC DEVICE AND COMPUTER-READABLE STORAGE MEDIUM

TECHNICAL FIELD

Embodiments of the present disclosure relate to, but are not limited to, the field of Internet technologies.

BACKGROUND

In wireless communications, a receiving device may acquire a radio frame sent from a transmitting device to calculate channel state information between the receiving device and the transmitting device, and feed back the channel state information to the transmitting device; and the transmitting device thus utilizes the channel state information for data transmission operations such as beamforming, in which the channel state information acquisition may be accomplished through a channel measurement process.

In a wireless local area network (WLAN), common devices are divided into access points (APs) and stations (STAs). Both the AP and the STA may serve as a transmitting device or a receiving device. In the existing art, when a WLAN system performs downlink channel measurement, an AP will send a null data packet (NDP) to one or more associated STAs. The NDP carries one or more long training fields (LTFs). After receiving the NDP, the STA calculates channel state information between the STA and the AP using the LTFs carried in the NDP, and feeds back the channel state information to the AP.

The related downlink channel detection mode in the WLAN system is that each STA receives an NDP sent from an AP, and calculates channel state information between the transmitting device and the receiving device through the NDP.

SUMMARY

In one aspect, an embodiment of the present disclosure provides a channel measurement method, including: separately determining, by each first device, a first mask sequence, and transforming, by the first device, the first mask sequence to obtain a second mask sequence, and processing, by the first device, a first measurement sequence with the second mask sequence to obtain a second measurement sequence, wherein the first mask sequence corresponds to the first device; and carrying, by the first device, the second measurement sequence in a channel measurement frame, and sending, by the first device, the channel measurement frame to at least one second device for channel measurement.

In another aspect, an embodiment of the present disclosure provides a channel measurement method, including: performing, by a second device, inner product on a third measurement sequence with a first mask sequence, and extending a value of the inner product to obtain a channel measurement result between the second device and a corresponding first device, and generate a feedback frame that is sent to the first device; wherein the third measurement sequence is obtained by transforming from a second measurement sequence contained in a channel measurement frame received by the second device and formed from a channel measurement frame sent from the first device passing through a channel.

In yet another aspect, an embodiment of the present disclosure provides a channel measurement apparatus, including: an acquisition module configured to determine a first mask sequence and transform the first mask sequence to obtain a second mask sequence, and mask a first measurement sequence with the second mask sequence to obtain a second measurement sequence; wherein the first mask sequence corresponds to the channel measurement apparatus; and a transmitting module configured to carry the second measurement sequence in each channel measurement frame, and send the channel measurement frame to at least one receiving device for channel measurement.

In still another aspect, an embodiment of the present disclosure provides a channel measurement apparatus, including: a measurement module configured to perform inner product on a third measurement sequence with a first mask sequence, and extend a value of the inner product to obtain a channel measurement result between the second device and a corresponding transmitting device, and generate a feedback frame that is sent to the transmitting device; wherein the third measurement sequence is obtained by transforming from a second measurement sequence contained in a received channel measurement frame that is formed from a channel measurement frame sent from the transmitting device passing through a channel.

In still another aspect, an embodiment of the present disclosure provides an electronic device, including: one or more processors; and a storage storing one or more programs thereon which, when executed by the one or more processors, cause at least one operation of any of the above channel measurement methods to be implemented.

In still another aspect, an embodiment of the present disclosure provides a computer-readable storage medium having a computer program stored thereon which, when executed by a processor, causes at least one operation of any of the above channel measurement methods to be implemented.

BRIEF DESCRIPTION OF DRAWINGS

Accompanying drawings are provided for further understanding of the embodiments of the disclosure and constitute a part of the specification. Hereinafter, these drawings are intended to explain the disclosure together with the following embodiments, but should not be considered as a limitation to the disclosure. The above and other features and advantages will become more apparent to those skilled in the art through detailed description of the exemplary embodiments with reference to the accompanying drawings.

DETAIL DESCRIPTION OF EMBODIMENTS

To improve understanding of the technical solutions of the present disclosure for those skilled in the art, the code division based channel measurement method and apparatus, the electronic device and the computer-readable storage medium provided in the present disclosure will be described below in detail in conjunction with the accompanying drawings.

Exemplary embodiments will be described more sufficiently below with reference to the accompanying drawings, but which may be embodied in different forms and should not be construed as limited to the embodiments set forth herein. Rather, these embodiments are provided so that the present disclosure will be thorough and complete, and will fully convey the scope of the present disclosure to those skilled in the art.

As used in herein, the term "and/or" includes any and all combinations of one or more of the associated listed items.

The terminology used herein is for the purpose of describing specific embodiments only and is not intended to limit the present disclosure. As used herein, the singular forms "a", "an" and "the" are intended to include the plural forms as well, unless the context clearly indicates otherwise. It will be further understood that as used herein, the terms "comprise" and/or "consist of . . . " specify the presence of stated features, integers, steps, operations, elements, and/or components, but do not preclude the presence or addition of one or more other features, integers, steps, operations, elements, components, and/or groups thereof.

Embodiments described herein may be described with reference to plan and/or sectional views in idealized representations of the present disclosure. Accordingly, the example illustrations may be modified in accordance with manufacturing techniques and/or tolerances. Accordingly, the embodiments are not limited to the embodiments shown in the drawings, but include modifications of configurations formed based on a manufacturing process. Thus, the regions illustrated in the figures have schematic properties, and the shapes of the regions shown in the figures illustrate specific shapes of regions of elements, but are not intended to be limiting.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the existing art and the present disclosure, and will not be interpreted in an idealized or overly formal sense unless expressly so defined herein.

In an exemplary application scenario of the embodiments of the present disclosure, one of the first device and the second device is a transmitting device, and the other is a receiving device. The following embodiments are explained taking the first device being a transmitting device and the second device being a receiving device as an example.

Exemplarily, the exemplary application scenario is WLAN, which includes at least two transmitting devices and at least one receiving device. The transmitting device may include a plurality of antennas, the receiving device may include one or more antennas, and when both the transmitting device and the receiving device include more than one antenna, a multiple input multiple output (MIMO) system may be formed.

The transmitting device and the receiving device involved in the embodiments of the present disclosure may be base stations, APs, personal basic service set control points (PCPs), or devices in an access network that are in communication with a wireless terminal through one or more sectors on an air interface. For example, the base station may be a base transceiver station (BTS) in a global system for mobile communications (GSM) or code division multiple access (CDMA), or a base station (NodeB) in a wideband code division multiple access (WCDMA), or an evolutional node B (eNB or e-NodeB) in long term evolution (LTE), which is not limited in the embodiments of the present disclosure.

The transmitting device or receiving device involved in the embodiments of the present disclosure may also be devices that provide voice and/or data connectivity for a user, handheld devices with wireless connectivity, or other processing devices connected to a wireless modem. The wireless terminal may be, among other things, a mobile terminal, for example, a mobile telephone (or "cellular" phone) or a computer having mobile terminals, such as portable, pocket, hand-held, computer-included, or vehicle-mounted mobile devices, that exchange language and/or data with a radio access network. Examples of such devices include personal communication service (PCS) phones, cordless phones, session initiation protocol (SIP) phones, wireless local loop (WLL) stations, personal digital assistants (PDAs), and the like. A wireless terminal may also be referred to as a system, a subscriber unit, a subscriber station, a mobile station, a mobile platform, a remote station, an STA, a remote terminal, an access terminal, a user terminal, a user agent, a user device, or a user equipment.

According to an embodiment of the present disclosure, the channel measurement frame may include, but is not limited to, an NDP frame, or may be one or more beam refinement protocol (BRP) frames containing beam reference signals (e.g., a training field (TRN) and a channel estimation field (CEF)). The following embodiments of the present disclosure are explained taking the channel measurement frame as being NDP frame, and the channel measurement sequence being an LTF as an example. Apparently, it should be understood that the channel measurement sequence is not limited to LTF.

According to an embodiment of the present disclosure, one transmitting device may send channel measurement frames to one or more receiving devices. The channel measurement frame from the transmitting device may be sent through multiple antennas of the transmitting device, and for the specific number of antennas used for sending, it is not limited in the embodiments of the present disclosure. The transmitting antenna of the transmitting device may be a logical antenna or a physical antenna.

Figure 1:
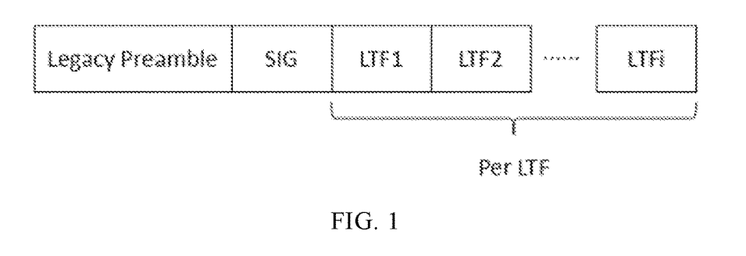
FIG. 1 is a schematic structural diagram of a channel measurement frame.

For a multi-antenna transmitting device, the sent NDP frame may include a plurality of LTFs, as shown in FIG. 1, which is a schematic structural diagram of a channel measurement frame. The plurality of LTFs in the NDP are divided into multiple groups according to the number of antennas; in which each LTF group includes a fixed number of LTFs, and an orthogonal mapping matrix corresponding to the number of LTFs in each group is selected. For example, an orthogonal mapping matrix $$P = \begin{bmatrix} 1 & -1 \\ 1 & 1 \end{bmatrix}$$

is selected for each group; or, when each group includes 4 LTFs, an orthogonal mapping matrix $$P = \begin{bmatrix} 1 & -1 & 1 & 1 \\ 1 & 1 & -1 & 1 \\ 1 & 1 & 1 & -1 \\ -1 & 1 & 1 & 1 \end{bmatrix}$$

is selected.

Figure 2:
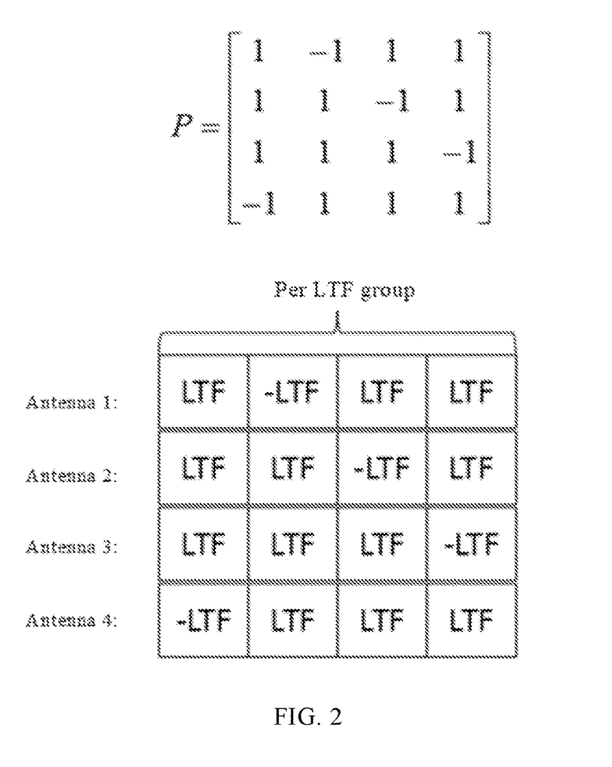
FIG. 2 is a schematic diagram of an LTF sequence for multi-antenna transmission provided in an embodiment of the present disclosure.

An orthogonal mapping matrix P is used for orthogonal mapping of LTFs in each LTF group of the NDP frame sent through each antenna, as shown in FIG. 2, which is a schematic diagram of an LTF sequence for multi-antenna transmission provided in an embodiment of the present disclosure.

In an embodiment of the present disclosure, LTF' represents a frequency domain sequence of a $j^{th}$ LTF group contained in the NDP sent from an $i^{th}$ transmitting device; $CB_i$ represents an orthogonal mask base sequence sent from the $i^{th}$ transmitting device; $C_{bi}^{j}$ represents a subsequence $C_{bi}^{j} \subseteq CB_i$ of $CB_i$ assigned to the $j^{th}$ LTF group of the $i^{th}$ transmitting device; $C_i^{j}$ represents a mask for the $j^{th}$ LTF group of the $i^{th}$ transmitting device; $\bigcirc$ represents an arithmetic operator, indicating multiplying elements at corresponding positions of a matrix or vector; $y^i$ represents a signal of the $j^{th}$ LTF group received by the receiving device; the subscript i represents an index of a corresponding transmitting device; and the superscript j represents an index of each LTF group of the NDP sent from the corresponding transmitting device, where each LTF group contains one or more LTFs; or an index of each LTF group received by the corresponding receiving device, where i and j are each an integer greater than or equal to 1.

Figure 3:
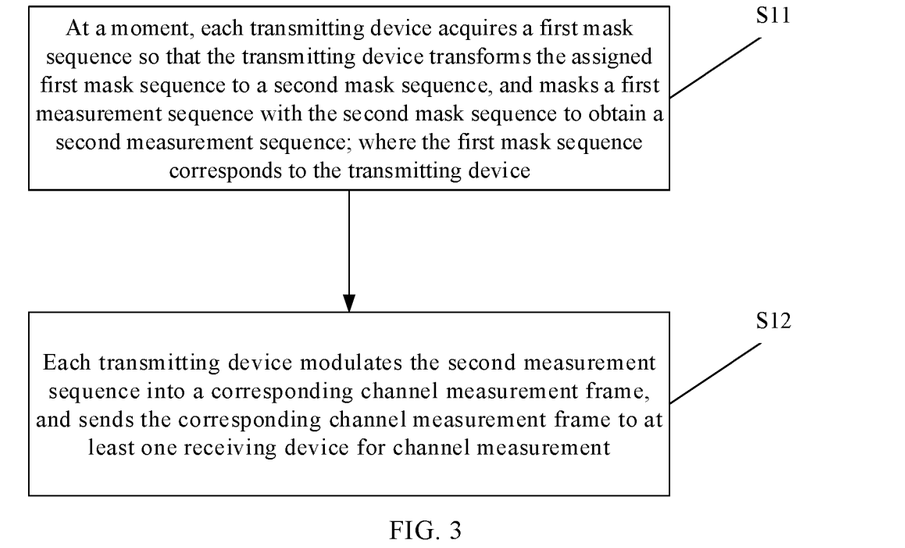
FIG. 3 is a schematic flowchart of a channel measurement method provided in an embodiment of the present disclosure.
Figure 4:
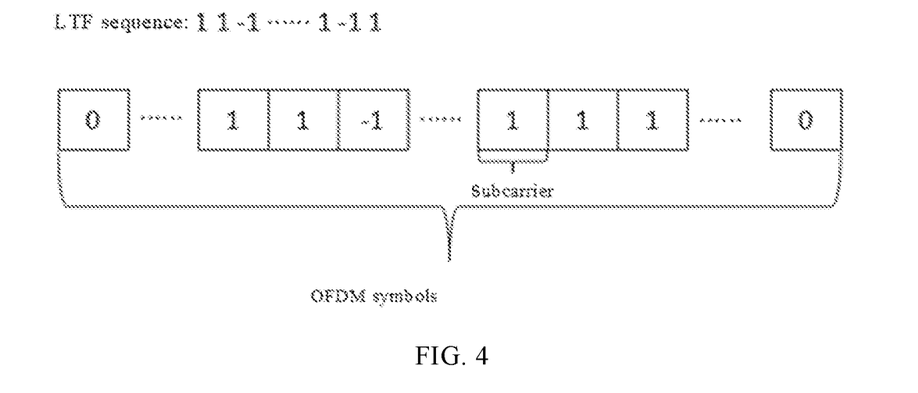
FIG. 4 is a schematic diagram showing correspondence between an LTF sequence and an OFDM symbol provided in an embodiment of the present disclosure.
Figure 5:
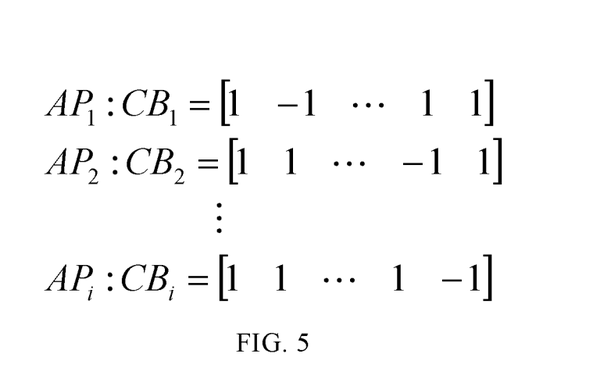
FIG. 5 is a schematic diagram of an orthogonal mask base sequence of a transmitting device provided in an embodiment of the present disclosure.
Figure 6:
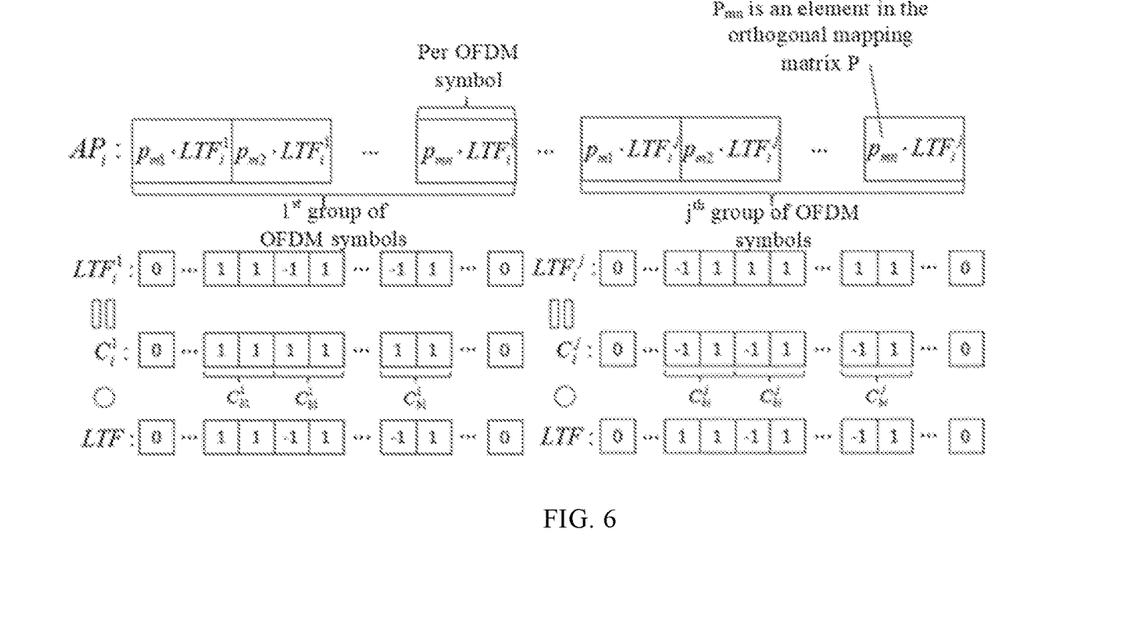
FIG. 6 is a schematic diagram illustrating generation of LTF sequences after being masked at the transmitting device provided in an embodiment of the present disclosure.
Figure 7:
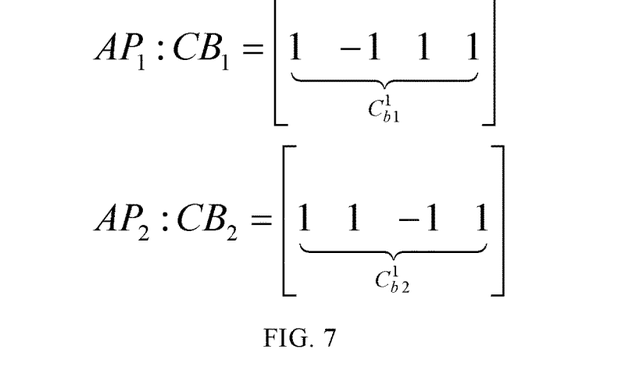
FIG. 7 is a schematic diagram of orthogonal mask base sequences at the transmitting side provided in an embodiment of the present disclosure.
Figure 8:
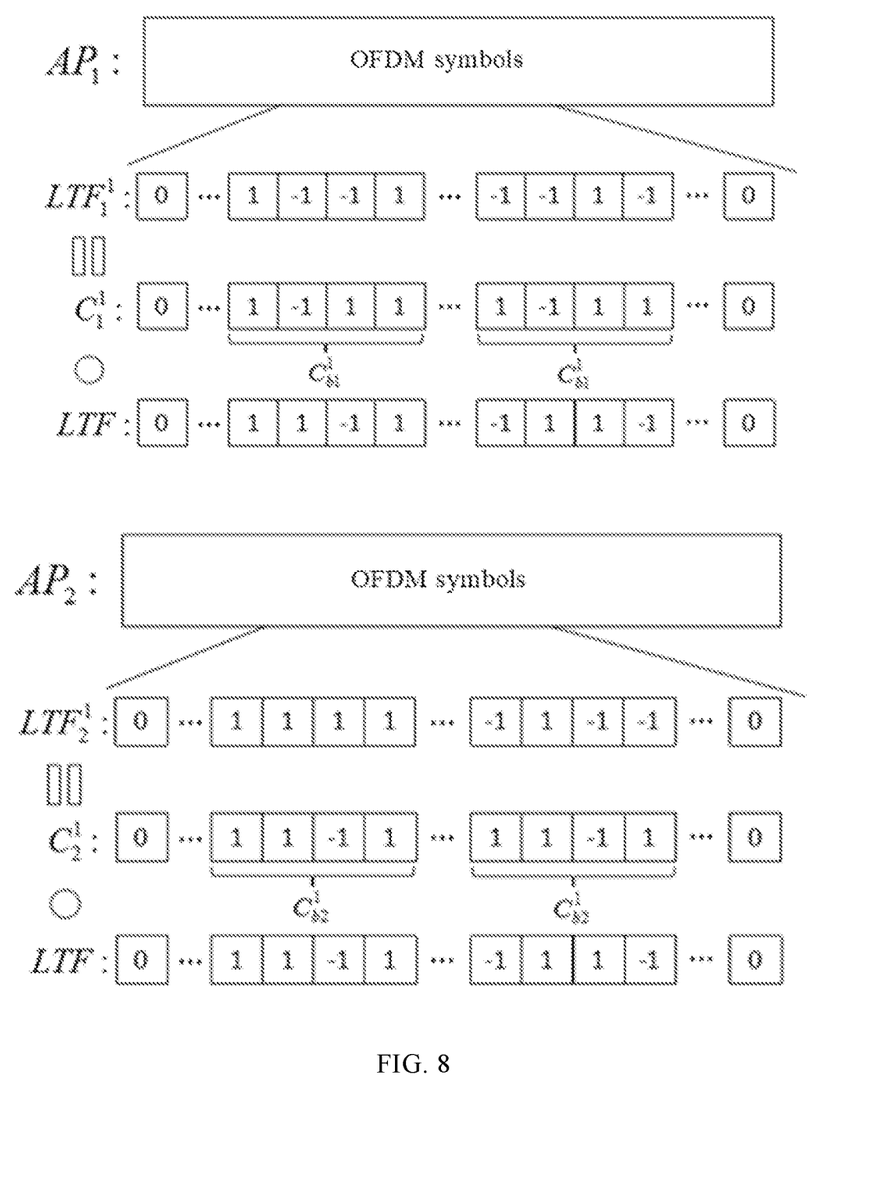
FIG. 8 is a schematic diagram illustrating generation of LTF sequences after being masked at the transmitting side provided in an embodiment of the present disclosure.

An embodiment of the present disclosure provides a channel measurement method, as shown in FIG. 3, which is a schematic flowchart of a channel measurement method provided in an embodiment of the present disclosure. The channel measurement method may include operations S11 and S12.

In operation S11, at a moment, each transmitting device acquires a first mask sequence so that the transmitting device transforms the assigned first mask sequence to a second mask sequence, and masks a first measurement sequence with the second mask sequence to obtain a second measurement sequence; where the first mask sequence corresponds to the transmitting device.

According to an embodiment of the present disclosure, the first mask sequence for each transmitting device may be acquired by negotiation between transmitting devices, or may be assigned by a master transmitting device to each remaining transmitting device, or may be assigned to each transmitting device through a device (that is, a third device) configured to manage the transmitting devices. The first measurement sequence may be a predetermined measurement sequence, such as an LTF.

In operation S12, each transmitting device modulates the second measurement sequence into a corresponding channel measurement frame, and sends the corresponding channel measurement frame to at least one receiving device for channel measurement.

In the embodiments of the present disclosure, when a plurality of transmitting devices send channel measurement frames to one or more receiving devices at the same time to perform channel measurement, different first mask sequences are assigned to different transmitting devices so that the receiving devices receive different second measurement sequences in different channel measurement frames. As a result, the receiving devices can distinguish where different channel measurement frames come from, and thus complete the feedback of multiple pieces of channel measurement information at the same time.

In some embodiments, the transmitting devices correspond to first mask sequences of the same length and orthogonal to each other.

In some embodiments, the first measurement sequence may be a fixed sequence, and may include, but is not limited to, LTFs.

In some embodiments, the second mask sequence may be obtained by transforming from a first mask sequence, which includes a process of: selecting and extending a subsequence of the first mask sequence to generate a corresponding second mask sequence; where at least one subsequence is selected.

In some embodiments, a plurality of subsequences of the same length may be selected, and the number of subsequences may be less than or equal to the number of non-zero elements in the first measurement sequence; and meanwhile, an intersection of the subsequences is an empty set, and a union of the subsequences is the first mask sequence. For example: the first mask sequence is [a b c d], and two subsequences are selected, one of which may be [a b] and the other may be [c d].

In some embodiments, the number of second mask sequences equals to the number of subsequences.

In some embodiments, the operation of selecting and extending the subsequence of the first mask sequence to generate the corresponding second mask sequence may includes: for one subsequence, if a length of the subsequence is N, the number of non-zero elements in the first measurement sequence is M, and the quotient of M divided by N is an integer K, repeating the subsequence K times in a relationship to generate a corresponding second mask sequence; where the relationship includes an equality relationship or a multiple relationship; and if the length of the subsequence is N, the number of non-zero elements in the first measurement sequence is M, and the quotient of M divided by N is an integer K and a remainder Z, repeating the subsequence K times in the relationship, and complementing the remaining Z digits with first Z digits of the subsequence; and performing zero padding on the subsequence after the repeating for K times so that the subsequence after zero padding has a length equal to the first measurement sequence, and a position of zero in the subsequence after zero padding corresponds to a position of zero in the first measurement sequence.

The following describes the channel measurement method provided in the embodiments of the present disclosure with reference to examples.

Taking a channel measurement apparatus as an executive body, the channel measurement apparatus may be integrated in any transmitting device, or may be provided independently.

At a moment, the channel measurement apparatus controls a plurality of transmitting devices to send channel measurement frames to at least one receiving device for channel measurement. The description is made by taking the channel measurement frames being NDP frames as an example.

The NDPs simultaneously sent from the transmitting devices controlled by the channel measurement apparatus carry therein orthogonal frequency division multiplexing (OFDM) symbols of a plurality of modulated second measurement sequences. Each second measurement sequence is obtained by masking a first measurement sequence with a second mask sequence, the second mask sequence is transformed from a first mask sequence, and a length of the first mask sequence for this measurement is selected to be greater than or equal to the number of transmitting devices.

A first example, as shown in FIGS. 4 to 8, involves two transmitting devices, i.e., a transmitting device 1 and a transmitting device 2. OFDM symbols of the modulated second measurement sequences sent from each device may be divided into one group according to the number of antennas of the transmitting device. The number of OFDM symbols included in each group equals to the number of antennas of the transmitting device, and a length of the first mask sequence for this measurement is selected to be L, where the first mask sequence for the transmitting device 1 is selected to be $CB_1$, the first mask sequence for the transmitting device 2 is selected to be $CB_2$, and the number of non-zero elements in the first measurement sequence is 56.

A subsequence $C_{b1}{}^1$ of $CB_1$ is selected and extended to a second mask sequence $C_1{}^1$ of the transmitting device 1 according to the number of non-zero elements in the first measurement sequence; and a subsequence $C_{b1}{}^1$ of $CB_2$ is selected and extended to a second mask sequence $C_2{}^1$ of the transmitting device 2 according to the number of non-zero elements in the first measurement sequence. When L=2, $C_1{}^1$ contains 28 identical structures $C_{b1}{}^1$, i.e., $[C_{b1}{}^1, C_{b1}{}^1, \ldots, C_{b1}{}^1]$, and $C_2{}^1$ contains 28 identical structures $C_{b2}{}^1$, i.e., $[C_{b2}{}^1, C_{b2}{}^1 \ldots, C_{b2}{}^1]$; and When L=4, $C_1{}^1$ contains 14 identical structures $C_{b1}{}^1$, i.e., $[C_{b1}{}^1, C_{b1}{}^1 \ldots, C_{b1}{}^1]$; and $C_2{}^1$ contains 28 identical structures $C_{b2}{}^1$, i.e., $[C_{b2}{}^1, C_{b2}{}^1 \ldots, C_{b2}{}^1]$.

A first LTF group of the transmitting device 1 is masked with $C_1{}^1$ to obtain a second measurement sequence, i.e., sequence $LTF_1{}^1$, which is modulated in the NDP frame sent from the transmitting device 1; and a first LTF group of the transmitting device 2 is masked with $C_2{}^1$ to obtain a second measurement sequence, i.e., sequence $LTF_2{}^1$, which is modulated in the NDP frame sent from the transmitting device 2.

Each second measurement sequence is orthogonally mapped as described above.

Figure 9:
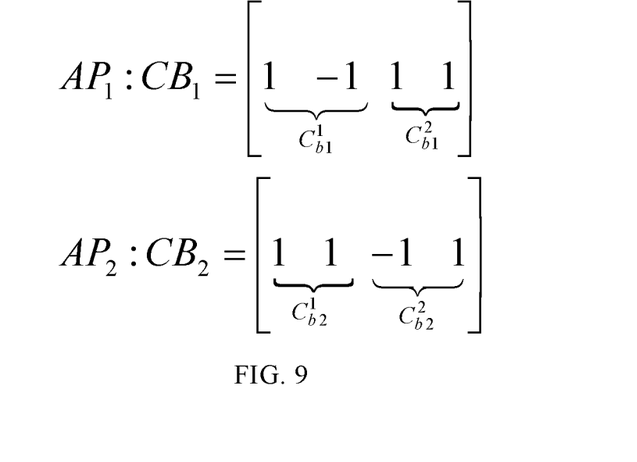
FIG. 9 is another schematic diagram of orthogonal mask base sequences at the transmitting side provided in an embodiment of the present disclosure.
Figure 10:
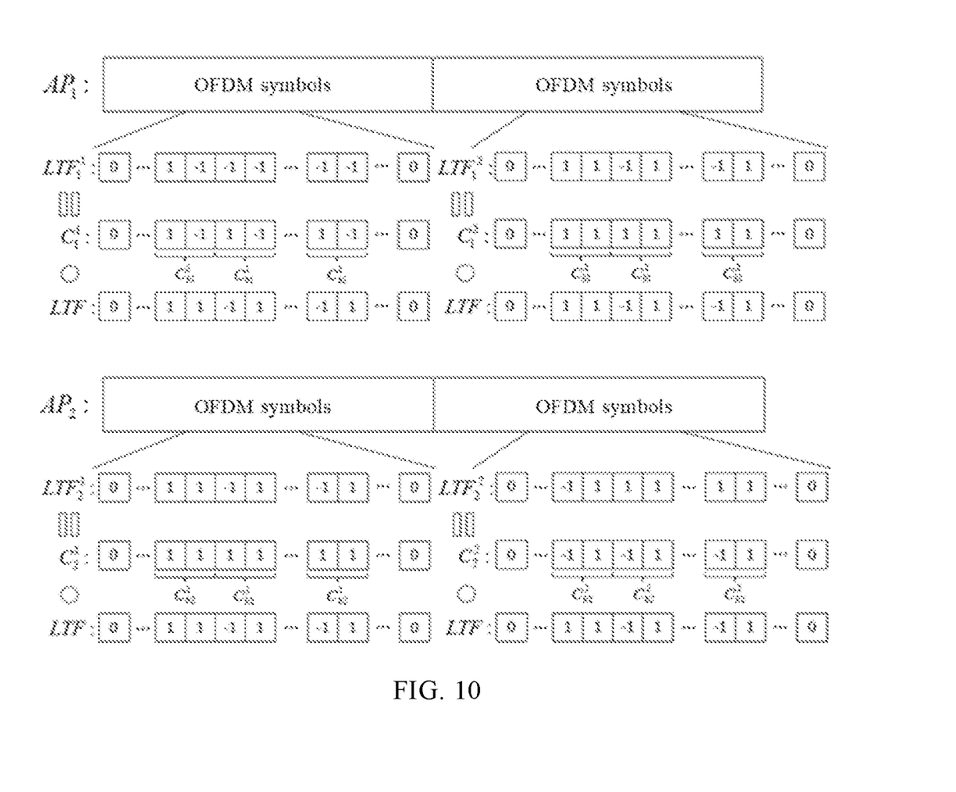
FIG. 10 is another schematic diagram illustrating generation of LTF sequences after being masked at the transmitting side provided in an embodiment of the present disclosure.

A second example, as shown in FIGS. 9 to 10, involves two transmitting devices, i.e., a transmitting device 1 and a transmitting device 2. OFDM symbols of the modulated second measurement sequences sent from each device may be divided into two groups according to the number of antennas of the transmitting device. The number of OFDM symbols included in each group equals to the number of antennas of the transmitting device, and a length of the first mask sequence for this measurement is selected to be 4, where the first mask sequence for the transmitting device 1 is selected to be $CB_1$, the first mask sequence for the transmitting device 2 is selected to be $CB_2$, and the number of non-zero elements in the first measurement sequence is 56.

Two subsequences of $CB_1$, $C_{b1}{}^1$ and $C_{b1}{}^2$, having a length of 2 are selected, where $C_{b1}{}^1 \cap C_{b1}{}^2 = \emptyset$, and $C_{b1}{}^1 \cap C_{b1}{}^2 \cup C_{b1}{}^2 = CB_1$, $C_{b1}{}^1$ is extended to a second mask sequence $C_1{}^1$ of the transmitting device 1 according to the number of non-zero elements in the first measurement sequence; and $C_{b1}{}^2$ is extended to a second mask sequence $C_1{}^2$ of the transmitting device 1 according to the number of non-zero elements in the first measurement sequence; and two subsequences of $CB_2$, $C_{b2}{}^1$ and $C_{b2}{}^2$, having a length of 2 are selected, where $C_{b2}{}^1 \cap C_{b2}{}^2 = \emptyset$, and $C_{b2}{}^1 \cup C_{b2}{}^2 = CB_2$, $C_{b1}{}^2$ is extended to a second mask sequence $C_2{}^1$ of the transmitting device 2 according to the number of non-zero elements in the first measurement sequence; and $C_{b2}{}^2$ is extended to a second mask sequence $C_2{}^2$ of the transmitting device 2 according to the number of non-zero elements in the first measurement sequence. $C_1{}^1$ contains 28 identical structures $C_{b1}{}^1$, i.e., $[C_{b1}{}^1, C_{b1}{}^1 \ldots, C_{b1}{}^1]$; $C_1{}^2$ contains 28 identical structures $C_{b1}{}^1$, i.e., contains 28 identical structures $C_{b2}{}^1$, i.e., $[C_{b2}{}^1, C_{b2}{}^1, \ldots, C_{b2}{}^1]$; and $C_2{}^2$ contains 28 identical structures $C_{b2}{}^2$, i.e., $[C_{b2}{}^2, C_{b2}{}^2 \ldots, C_{b2}{}^2]$.

A first LTF group of the transmitting device 1 is masked with $C_1{}^1$ to obtain a second measurement sequence, i.e., sequence $LTF_1{}^1$, and a second LTF group of the transmitting device 1 is masked with $C_1{}^2$ to obtain a second measurement sequence, i.e., sequence $LTF_1{}^2$, and $LTF_1{}^1$ and $LTF_1{}^2$ are modulated in the NDP frame sent from the transmitting device 1; and a first LTF group of the transmitting device 2 is masked with $C_2{}^1$ to obtain a second measurement sequence, i.e., sequence $LTF_2{}^1$, and a second LTF group of the transmitting device 2 is masked with $C_2{}^2$ to obtain a second measurement sequence, i.e., sequence $LTF_2{}^2$, and $LTF_2{}^1$ and $LTF_2{}^2$ are modulated in the NDP frame sent from the transmitting device 2.

Each second measurement sequence is orthogonally mapped as described above.

An embodiment of the present disclosure further provides a channel measurement method, of which an executive body is a receiving device. The method may includes: measuring, by the receiving device after receiving a channel measurement frame as described above, channels between a plurality of transmitting devices and the receiving device according to the channel measurement frame, generating feedback frame information corresponding to each transmitting device, and sending the feedback frame information to a corresponding transmitting device.

According to an embodiment of the present disclosure, when a transmitting device sends an NDP frame to a receiving device, the receiving device may measure and obtain a signal strength, a signal quality, a signal noise ratio (SNR), or other beam indexes or the like of the NDP frame, and carry the same in the feedback frame to be sent to the corresponding transmitting device.

Figure 11:
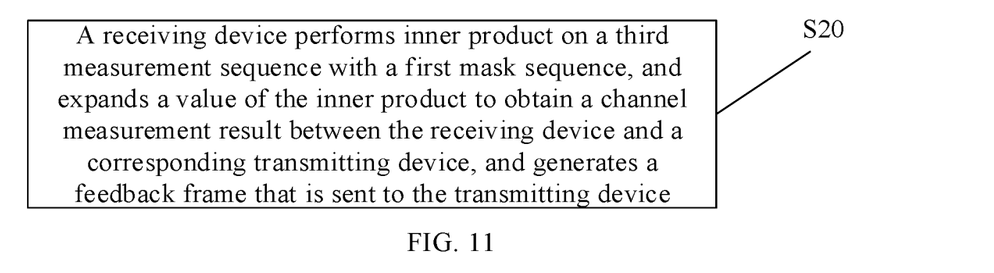
FIG. 11 is a schematic flowchart of another channel measurement method provided in an embodiment of the present disclosure.

The following explains a channel measurement method in the embodiments of the present disclosure. It should be understood that the channel measurement frame in the following description is a channel measurement frame sent from a transmitting device in the above embodiments. As shown in FIG. 11, which is a schematic flowchart of another channel measurement method provided in an embodiment of the present disclosure, the channel measurement method may include operation S20.

In operation S20, a receiving device performs inner product on a third measurement sequence with a first mask sequence, and extends a value of the inner product to obtain a channel measurement result between the receiving device and a corresponding transmitting device, and generates a feedback frame that is sent to the transmitting device. The third measurement sequence is obtained by transforming from a second measurement sequence contained in a channel measurement frame received by the receiving device and formed from a channel measurement frame sent from the transmitting device passing through a channel.

It should be understood that the third measurement sequence should correspond to the second measurement sequence carried in the channel measurement frame, and the second measurement sequence should correspond to the first measurement sequence as described above.

The number of the first mask sequences is the same as the number of the second mask sequences in the above embodiment.

In some embodiments, the transforming the first mask sequence to obtain the second mask sequence may include: selecting and extending a subsequence of the first mask sequence to generate a corresponding second mask sequence; where at least one subsequence is selected.

In some embodiments, the third measurement sequence is obtained by transforming from the second measurement sequence, which may include a process of: combining, by the receiving device, specific subsequences in a second measurement sequence to form a third measurement sequence, where the specific subsequences have the same length as the subsequence of the first mask sequence, and have the same position as an extended position of the subsequence of the first mask sequence; and the third measurement sequence has the same length as the first mask sequence, and the number of the third measurement sequences and the number of non-zero elements in the first measurement sequence are related to the length of the selected subsequence of the first mask sequence.

In some embodiments, the extending the value of the inner product to obtain the channel measurement result between the receiving device and each transmitting device may include: setting a relationship between a measurement result of the position of the specific subsequences and the value of the inner product to obtain a channel measurement result between the receiving device and each transmitting device. The relationship includes, but is not limited to, an equality relationship or a linear function relationship.

In some embodiments, the channel measurement method may include: performing, by the receiving device, Fourier transform on a channel measurement frame to obtain a frequency domain sequence of each symbol, combining, by means of the length of subsequence of the first mask sequence, frequency domains of symbols to obtain an estimation sequence of the same length as the first mask sequence, and controlling, according to an inner product of each estimation sequence and the first mask sequence of the corresponding transmitting device, channel state information on a sub carrier where the estimation sequence is located to be equal to a value of the inner product.

An example is given below to explain a channel measurement method at the transmitting device side provided in the embodiment of the present disclosure.

When a receiving device receives a channel measurement frame, the channel measurement frame is a superposed frame of the NDP frames sent from two transmitting devices, i.e., a transmitting device 1 and a transmitting device 2.

According to the known number of selected subsequences of the first mask sequence, OFDM symbols in the channel measurement frame are divided into the same number of groups as the subsequences of the first mask sequence. The number of OFDM symbols in each group corresponds to dimensions of the orthogonal mapping matrix as described above, and the grouping mode corresponds to the mode of grouping the OFDM symbols according to the number of antennas as described above.

Positions in the groups of OFDM symbols corresponding to the subsequence of the first mask sequence are combined according to structures of the respective second mask sequences to form a plurality of third measurement sequences each having the same length as the first mask sequence.

Inner product is performed on each third measurement sequence and the first mask sequence corresponding to the transmitting device to be measured, and a measurement value on the subcarrier where the third measurement sequence is located is made to be equal to a value of the inner product.

For example, the channel measurement frame includes 2 LTF groups, a first LTF group is generated from first LTF groups of the transmitting device 1 and the transmitting device 2 masked with the second mask sequences $C_1^{\ 1}$ and $C_2^{\ 1}$, and subjected to channel superposition, where $C_1^{\ 1}$ and $C_2^{\ 1}$ are generated from subsequences $C_{b1}^{\ 1}$ and $C_{b1}^{\ 2}$ of the first mask sequence; and the received second LTF group is generated from second LTF groups of the transmitting device 1 and the transmitting device 2 masked with the second mask sequences $C_1^{\ 2}$ and $C_2^{\ 2}$ and subjected to channel superposition, where $C_1^{\ 2}$ and $C_2^{\ 2}$ are generated from subsequences $C_{b1}^{\ 2}$ and $C_{b2}^{\ 2}$ of the first mask sequences $CB_1=[C_{b1}^{\ 1}, C_{b1}^{\ 2}]$ and $CB_2=[C_{b2}^{\ 1}, C_{b2}^{\ 2}]$.

In the first and second LTF groups, the receiving device obtains the following information:

$$[y^1, y^2] = \left[\sum_{m=1}^{2} Hm \circ C_m^1 \circ LTF, \sum_{m=1}^{2} Hm \circ C_m^2 \circ LTF\right] =$$

$$\sum_{m=1}^{2} Hm \circ \begin{bmatrix} C_{bm}^1 & C_{bm}^2 \\ C_{bm}^1 & C_{bm}^2 \\ \ldots & \ldots \\ C_{bm}^1 & C_{bm}^2 \end{bmatrix} \circ LTF = \sum_{m=1}^{2} Hm \circ \begin{bmatrix} CB_m \\ CB_m \\ \ldots \\ CB_m \end{bmatrix} \circ LTF(j=1,2,3).$$

Since $CB_1 \cdot CB_1^{\ T}=1$, $CB_2 \ CB_2^{\ T}=1$, $CB_1 \cdot CB_2^{\ T}=0$, and $CB_2 \cdot CB_1^{\ T}=0$, the channel estimation may be performed as follows:

$$[y^1, y^2] \circ \frac{1}{LTF} \cdot CB_1 = H_1 \circ \begin{bmatrix} CB_1 \\ CB_1 \\ \ldots \\ CB_1 \end{bmatrix} \cdot CB_1^T + H_2 \circ \begin{bmatrix} CB_2 \\ CB_2 \\ \ldots \\ CB_2 \end{bmatrix} \cdot CB_1^T = H_1; \text{ and}$$

$$[y^1, y^2] \circ \frac{1}{LTF} \cdot CB_2 = H_1 \circ \begin{bmatrix} CB_1 \\ CB_1 \\ \ldots \\ CB_1 \end{bmatrix} \cdot CB_2^T + H_2 \circ \begin{bmatrix} CB_2 \\ CB_2 \\ \ldots \\ CB_2 \end{bmatrix} \cdot CB_2^T = H_2.$$

Figure 12:
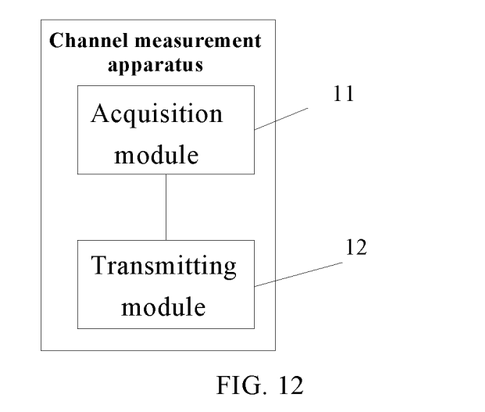
FIG. 12 is a schematic structural diagram of a code division based channel measurement apparatus provided in an embodiment of the present disclosure.

An embodiment of the present disclosure further provides a channel measurement apparatus, as shown in FIG. 12, which is a schematic structural diagram of a code division based channel measurement apparatus provided in an embodiment of the present disclosure. The channel measurement apparatus may include an acquisition module 11 and a transmitting module 12. The acquisition module 11 may be configured to acquire a first mask sequence and transform the first mask sequence thereof to obtain a second mask sequence, and mask a first measurement sequence with the second mask sequence to obtain a second measurement sequence. First mask sequences correspond to channel measurement apparatuses one by one. The transmitting module 12 may be configured to carry the second measurement sequence in each channel measurement frame, and send the channel measurement frame to at least one receiving device for channel measurement.

It should be noted here that the acquisition module 11 in the embodiments of the present disclosure may be configured to execute the operation S11 as described above; and the transmitting module 12 may be configured to perform the operation S12 as described above.

According to the channel measurement apparatus provided in the embodiments of the present disclosure, when a plurality of channel measurement apparatuses send channel measurement frames to one or more receiving devices at the same time to perform channel measurement, different first mask sequences may be assigned to different channel measurement apparatuses so that the receiving devices receive different second measurement sequences in different channel measurement frames. As a result, the receiving devices can distinguish where different channel measurement frames come from, and thus complete the feedback of multiple pieces of channel measurement information at the same time.

In some embodiments, the channel measurement apparatus may be integrated in a transmitting device. Apparently, the channel measurement apparatus may be provided independently.

Figure 13:
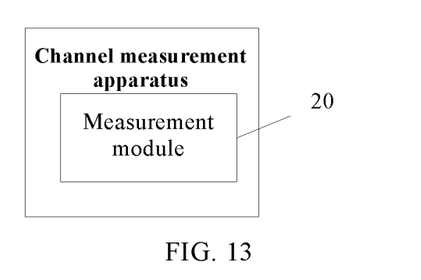
FIG. 13 is a schematic structural diagram of another channel measurement apparatus provided in an embodiment of the present disclosure.

An embodiment of the present disclosure further provides another channel measurement apparatus, as shown in FIG. 13, which is a schematic structural diagram of another channel measurement apparatus provided in an embodiment of the present disclosure. The channel measurement apparatus may include a measurement module 20. The measurement module 20 may be configured to perform inner product on a third measurement sequence with a first mask sequence, and extend a value of the inner product to obtain a channel measurement result between the channel measurement apparatus and a corresponding transmitting device, and generate a feedback frame that is sent to the transmitting device. The third measurement sequence is obtained by transforming from a second measurement sequence contained in a channel measurement frame received by the channel measurement apparatus and formed from a channel measurement frame sent from the transmitting device passing through a channel.

In some embodiments, the channel measurement apparatus may be a receiving device.

It should be noted here that the measurement module 20 in the embodiment of the present disclosure may be configured to execute the operation S20 as described above.

An embodiment of the present disclosure further provides an electronic device, including: one or more processors; and a storage storing one or more programs thereon which, when executed by the one or more processors, cause the one or more processors to implement at least one operation of any one of the channel measurement methods provided in the embodiments of the present disclosure.

An embodiment of the present disclosure further provides a computer-readable storage medium having a computer program stored thereon which, when executed by a processor, causes at least one operation of any one of the channel measurement methods provided in the embodiments of the present disclosure to be implemented.

Those of ordinary skill in the art will appreciate that all or some operations of the above described method, functional modules/units in the system and apparatus may be implemented as software, firmware, hardware, and suitable combinations thereof. In a hardware implementation, the division between the functional modules/units mentioned in the above description does not necessarily correspond to the division of physical components; for example, one physical component may have multiple functions, or one function or operation may be performed cooperatively by several physical components.

Some or all physical components may be implemented as software executed by a processor, such as a CPU, a digital signal processor or microprocessor, or implemented as hardware, or implemented as an integrated circuit, such as an application specific integrated circuit. Such software may be distributed on a computer-readable medium which may include a computer storage medium (or non-transitory medium) and communication medium (or transitory medium). As is well known to those of ordinary skill in the art, the term computer storage medium includes volatile and nonvolatile, removable and non-removable medium implemented in any method or technology for storing information, such as computer-readable instructions, data structures, program modules or other data. A computer storage medium includes, but is not limited to, RAM, ROM, EEPROM, flash memory or other memory technology, CD-ROM, digital versatile disc (DVD) or other optical disc storage, magnetic cartridge, magnetic tape, magnetic disk storage or other magnetic storage devices, or may be any other medium used for storing the desired information and accessible by a computer. Moreover, it is well known to one of ordinary skill in the art that a communication medium typically includes a computer-readable instruction, a data structure, a program module, or other data in a modulated data signal, such as a carrier wave or other transport mechanism, and may include any information delivery medium.

The present disclosure has disclosed exemplary embodiments, and although specific terms are employed, they are used and should be interpreted in a generic and descriptive sense only and not for purposes of limitation. In some instances, features, characteristics and/or elements described in connection with a particular embodiment may be used alone or in combination with features, characteristics and/or elements described in connection with other embodiments, unless expressly stated otherwise, as would be apparent to one skilled in the art. It will, therefore, be understood by those skilled in the art that various changes in form and details may be made therein without departing from the scope of the disclosure as set forth in the appended claims.

What is claimed is:

1. A channel measurement method, comprising:
separately determining, by each first device, a first mask sequence, and transforming, by the first device, the first mask sequence to obtain a second mask sequence, and processing, by the first device, a first measurement sequence with the second mask sequence to obtain a second measurement sequence, wherein the first mask sequence corresponds to the first device; and
carrying, by the first device, the second measurement sequence in a channel measurement frame, and sending, by the first device, the channel measurement frame to at least one second device, wherein the transforming the first mask sequence to obtain the second mask sequence comprises:
selecting and extending a subsequence of the first mask sequence to generate the second mask sequence; wherein at least one subsequence is selected.

2. The method according to claim 1, wherein the first mask sequence separately determined by the first device comprise:
a first mask sequence determined through mutual negotiation between first devices; or
a first mask sequence assigned by one of the first devices; or
a first mask sequence assigned by a third device.

3. The method according to claim 1, wherein a plurality of subsequences of a same length are selected, and the number of the plurality of subsequences is less than or equal to the number of non-zero elements in the first measurement sequence; and, an intersection of the plurality of subsequences is an empty set, and a union of the plurality of subsequences is the first mask sequence.

4. The method of claim 1, wherein the number of the second mask sequence equals to the number of the subsequence.

5. The method according to claim 1, wherein the selecting and extending the subsequence of the first mask sequence to generate the second mask sequence comprises:
in a case where a length of the subsequence is N, the number of non-zero elements in the first measurement sequence is M, the quotient of M divided by N is an integer K, and the remainder Z of M divided by N is zero, the second mask sequence encompasses K repetitions of the subsequence; and
in a case where the length of the subsequence is N, the number of non-zero elements in the first measurement sequence is M, the quotient of M divided by N is an integer K, and the remainder Z of M divided by N is greater than zero, the second mask sequence encompasses K repetitions of the subsequence followed by the first Z elements of the subsequence.

6. The method according to claim 1, wherein first mask sequences are orthogonal and with a same length.

7. A channel measurement apparatus, comprising a processor and a storage, wherein the storage is configured to store a program which, when executed by the processor, causes the processor to:
determine a first mask sequence and transform the first mask sequence to obtain a second mask sequence, and mask a first measurement sequence with the second mask sequence to obtain a second measurement sequence; wherein the first mask sequence corresponds to the channel measurement apparatus; and
carry the second measurement sequence in each channel measurement frame, and send the channel measurement frame to at least one receiving device,
wherein the second mask sequence is obtained by selecting and extending a subsequence of the first mask sequence to generate the second mask sequence; wherein at least one subsequence is selected.

* * * * *

UNITED STATES PATENT AND TRADEMARK OFFICE
CERTIFICATE OF CORRECTION

PATENT NO. : 12,199,796 B2
APPLICATION NO. : 17/770340
DATED : January 14, 2025
INVENTOR(S) : Qichen Jia et al.

It is certified that error appears in the above-identified patent and that said Letters Patent is hereby corrected as shown below:

In the Specification

Column 5, Line 37, the parameter reading -- LTF' --

Should read -- $LTF_i^j$ --

Column 7, Line 43, the parameter reading -- $C_{b1}^1$ --

Should read -- $C_{b2}^1$ --

Column 8, Lines 11-12, the formula reading -- $C_{b1} \cap C_{b1}^2 \cup C_{b1}^2 = CB_1$ --

Should read -- $C_{b1}^1 \cup C_{b1}^2 = CB_1$ --

Signed and Sealed this
Twenty-seventh Day of May, 2025

Coke Morgan Stewart
*Acting Director of the United States Patent and Trademark Office*